UNITED STATES PATENT OFFICE.

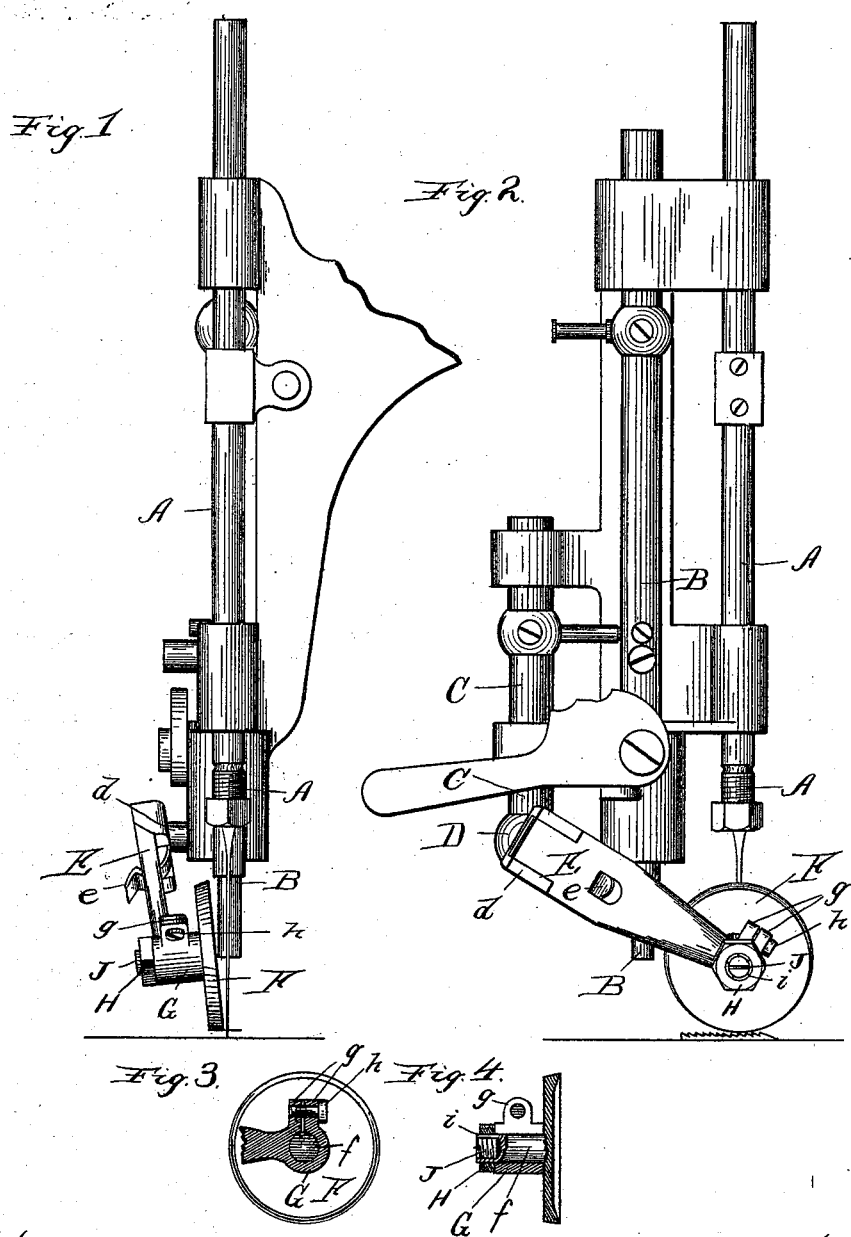

CHARLES TIMM, OF WASHINGTON HEIGHTS, ASSIGNOR TO THE UNION SPECIAL SEWING MACHINE COMPANY, OF CHICAGO, ILLINOIS.

PRESSER-FOOT FOR SEWING-MACHINES.

SPECIFICATION forming part of Letters Patent No. 408,767, dated August 13, 1889.

Application filed February 25, 1889. Serial No. 301,086. (No model.)

*To all whom it may concern:*

Be it known that I, CHARLES TIMM, a citizen of the United States, residing in Washington Heights, in the county of Cook and State of Illinois, have invented a new and useful Improvement in Roller Presser-Feet for Sewing-Machines, of which the following is a specification.

My aim in this invention is to obtain a durable bearing for the roller and at the same time to shorten the parts composing the bearing, so that they may be less in the way of the work than in the ordinary construction. I accomplish these results by the construction hereinafter described, and shown in the accompanying drawings, wherein similar letters of reference indicate like parts, and in which—

Figure 1 is a front elevation, and Fig. 2 a side elevation, of the needle end of a sewing-machine. Figs. 3 and 4 are cross and longitudinal sections, respectively, of the bearing for the roller-foot.

In said drawings, A represents the needle-bar; B, the ordinary presser-foot-carrying bar connected to and actuated from the needle-bar; and C, the supplemental bar, which is used to support the roller presser-foot when the latter is employed, and which bar is operated from the bar B. The roller-foot of my invention is connected to this supplemental bar by the collar D, the projection $d$ extending laterally from said collar, and the arm E hinged to said projection and controlled by the spring $e$. These parts, as well as the roller-foot itself, shown at F, may be of the ordinary construction.

My invention concerns the manner of supporting the roller F from the arm E; and it consists in providing the roller with a lateral axial stud $f$, which is let into and surrounded by the box or bearing G upon the lower end of arm E. This box or bearing is split at one side and provided with flanges $g$ at either side of the division, by means of which and the screws $h$ the sides can be tightened together, thereby enabling the taking up of the wear which may occur in the box and upon the stud. The stud, instead of being conical, as in the ordinary construction, is straight, or substantially so, and is held in the box by the collar or nut H, threaded on its outer end. To lock the nut H, the outer end of the stud is recessed and threaded to receive the screw J, and the margin of the recess is split, as shown at $i$, the insertion of the screw J tending to spread the split portion of the stud. By this construction I obtain a bearing for the roller, which, notwithstanding the peculiar and severe strain caused by the inclined position of the roller when in use, will prove very efficient and durable, and I am enabled by it to materially shorten the extent of the lateral projection by the parts, the bearing itself being much shorter than the best forms of those heretofore used.

I claim—

1. The inclined roller presser-foot for sewing-machines, having a straight lateral axial stud in combination with a split inclosing bearing or box for such stud on the supporting-arm, means for confining the stud in the bearing, and independent means for tightening the bearing, substantially as set forth.

2. The roller presser-foot having the axial stud recessed and split at its outer end, the supporting-arm having the split bearing for the stud, the collar H, for confining the stud in said bearing, and the screw J, for expanding the outer end of the stud, all combined and operating substantially as set forth.

CHARLES TIMM.

Witnesses:
W. S. NORTH,
C. McNEIL.